United States Patent [19]

Gogg

[11] 3,700,867
[45] Oct. 24, 1972

[54] AXIAL TRAJECTORY SENSOR FOR ELECTRONIC PARTICLE STUDY APPARATUS AND METHOD

[72] Inventor: Walter R. Gogg, Miami Lakes, Fla.

[73] Assignee: Coulter Electronics, Inc., Hialeah, Fla.

[22] Filed: Dec. 24, 1970

[21] Appl. No.: 101,325

Related U.S. Application Data

[63] Continuation-in-part of Ser. No. 84,440, Oct. 27, 1970.

[52] U.S. Cl............235/151.3, 235/92 PC, 307/234, 324/76 R, 328/112
[51] Int. Cl.................................................H03k 5/18
[58] Field of Search...235/92 PB, 92 PC, 92 MT, 151.3, 235/151.31; 307/234; 328/111, 112; 324/76R

[56] References Cited

UNITED STATES PATENTS 3,441,848    4/1969    Valley et al. .......235/92 PB X

Primary Examiner—Malcolm A. Morrison
Assistant Examiner—R. Stephen Dildine, Jr.
Attorney—Silverman & Cass

[57] ABSTRACT

A sensor for use with apparatus operating in accordance with the principles of the Coulter electronic particle studying device, for differentiating between signals from particles passing on axial or near axial paths through an aperture and particles passing off center. The pulse duration is measured at some fraction of the individual pulse amplitudes and only those which meet the criteria of duration established by the electronic circuitry are permitted to pass for use in pulse height analysis apparatus following the sensor. The other pulses are discarded on the basis of their greater durations. The apparatus of the invention provides structure for deriving a duration-measuring pulse whose duration is that of the particle pulse at its fractional amplitude, structure for converting the signal into one which has an amplitude proportional to duration, and then measuring the latter signal against a certain maximum level to operate gating means automatically for rejecting the longer duration pulses and passing the shorter duration pulses. The maximum level is automatically produced by structure which responds to the level of prior passed pulses thereby establishing a maximum duration which when exceeded will cause a pulse to be discarded.

32 Claims, 9 Drawing Figures

PATENTED OCT 24 1972 3,700,867

INVENTOR
WALTER R. HOGG

By Silverman & Cass
ATTORNEYS

INVENTOR
WALTER R. HOGG

AXIAL TRAJECTORY SENSOR FOR ELECTRONIC PARTICLE STUDY APPARATUS AND METHOD

CROSS REFERENCE TO RELATED APPLICATION

This application is a continuation-in-part of my co-pending application having the same title, Ser. No. 84,440 filed Oct. 27, 1970.

BACKGROUND OF THE INVENTION

The field of this invention is particle analyzing apparatus and more particularly is concerned with apparatus in which studies may be made of particulate systems using the Coulter sensing principle in a manner to obtain more accurate size information than heretofore achieved.

The Coulter sensing principle is disclosed in U.S. Pat. No. 2,656,508 issued Oct. 20, 1953 to Wallace H. Coulter. According to this principle, when a microscopic particle in suspension in an electrolyte is passed through an electrical field of small dimensions approaching those of the particle, there will be a momentary change in the electric impedance of the electrolyte in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U.S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary changes in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between different pulse amplitudes, one can make size studies. This invention is primarily concerned with size studies, and has, as a very important object thereof, the provision of apparatus which will enable highly accurate particle size data to be achieved.

It has been known that "long" apertures can produce results which are superior to short apertures insofar as size measurements are concerned, if the bandwidths of the associated amplifiers are reduced accordingly. A long aperture may be considered one in which the length is greater than the diameter. The usual Coulter aperture is relatively short, that is, its length is the same as or less than its diameter.

The reason for better size information with long apertures is that the electrical field halfway through the aperture, being the position most remote from the entrance and exit of the aperture, is most uniform and has the most uniform current distribution for all paths through the aperture. The longer the aperture, the more nearly uniform is the field at this midpoint. At the entrance and exit of the aperture, the current density is greater at the edges of the aperture and correspondingly lesser on the axis of the aperture. This may be explained by pointing out that current paths other than the axial path are supplied from the sides of the aperture as well as straight ahead. The lower current density on the axis at the entrance and exit results in a lower instantaneous signal than is the case for particles entering the aperture and leaving it on other paths. In other words, the current density at the corners of the aperture is greater than at the axis.

Another phenomenon is important to consider, according to this invention. The velocity of electrolyte flow, and hence the velocity of particles also, is somewhat greater on an axial path than on paths closer to the edges of the aperture or paths which are off-center, because the liquid does not have to change direction when it goes through the axial center of the aperture. The resistance to flow is a minimum on the axis since it is surrounded by a moving sheath of liquid having substantially the same velocity.

The prior art has recognized the problem involved in the use of the Coulter apparatus for sizing studies, but so far as is known, there has been no satisfactory solution. One attempt involved releasing the particles in a suspension from a focussed source ahead of the aperture; but this involved the use of two apertures and the inability to illuminate and view the aperture during the process.

The use of long apertures poses too many problems to make the same practical. The long aperture has less sensitivity. It adds resistance to the effective aperture which generates noise tending to mask the signals. Microphonic modulation of the aperture is also increased. The long aperture is more likely to have coincident particles in it, giving rise to counting and sizing errors. The long aperture is more likely to become blocked by debris and is not as easy to clear as a short aperture. The flow rate of long apertures is decreased because of increased resistance to flow, thus decreasing the time for making any given studies.

The problems referred to above are solved by the basic invention which is disclosed in the previously mentioned co-pending application. Certain other problems with respect to the invention are additionally solved by the invention herein. The disclosure of the co-pending application utilizes manually controlled circuitry to establish the principal threshold for determining whether a given signal will be sensed or not. This requires testing and adjustment procedures which must be undertaken for practically every use of the apparatus. The invention herein utilizes circuitry which obviates the need for manual adjustment, but instead has an automatic memory device which responds to the duration of certain previously passed signals, and hence keeps itself adjusted to a certain duration level.

Other refinements of the invention herein are concerned with preventing the sensor from operating during the processing of a pulse, so that part pulses will not trigger the sensor and so that one pulse following immediately after another will not operate the sensor until the analysis is complete.

The invention herein also teaches the transmission of complete pulses through the sensor, as opposed to the transmission of synthetic pulses derived from complete pulses.

SUMMARY OF THE INVENTION

According to the invention, particles passing through an aperture are examined electronically to ascertain which of them passed most nearly on axial paths through the aperture. These are the only particles which are permitted to be regarded by the apparatus, the others being disregarded. The electronic selection is based on the fact that the particles following axial paths spend the least time in the ambit of the aperture, and therefore their corresponding pulses have the shortest duration. Theoretically, all pulses passing through the aperture, regardless of size, will have the same duration; but because of the reasons given above, this is not practically true. Pulses which pass through the aperture off-center will normally have longer durations.

By disregarding a percentage of the pulses, fewer are considered by the pulse height analyzing equipment which follows the sensor of the invention, resulting in a slight degradation in the statistical accuracy if a given amount of sample of a given concentration is scanned. The data which are achieved, however, are of much higher quality. If a count is required, this is made before the signals are processed in the sensor of the invention.

The particle pulses are examined by ascertaining their durations at some fraction of their amplitudes. The resulting measuring signal is then converted into a pulse whose amplitude is proportional to the duration of the measuring signal. This amplitude is then compared with certain criteria to ascertain whether the original pulse was of a size to be passed to the pulse height analyzing equipment or to be disregarded.

In this invention, the criteria are established by means of a minimum duration memory circuit which responds to the minimum pulses which are applied to the sensor. The circuit remembers the duration of the shortest of the previous pulses and does not pass any pulse whose duration is some predetermined small amount greater. Structure is provided to disable the sensor during the processing of a pulse to prevent application of any following pulses or part pulses while processing is occurring. Structure is also provided to disable the sensor unless the incoming signal has dropped below a predetermined threshold, to prevent processing of partial pulses.

A novel circuit for automatic adjustment of the maximum duration level is provided.

DESCRIPTION OF THE PREFERRED EMBODIMENTS

This invention is based upon a practical consideration of the electric pulses which result when a suspension of particles is passed through the aperture of a Coulter electronic particle analyzing device. Since the physical length of the aperture is constant, and one would consider that the rate of flow remains constant, it should follow that all particle pulses, that is, the electrical signals produced in the detector of the Coulter apparatus, should have the same duration. That this is not true has been known for some time. A particle passing through the aperture on an angle, such as for example, entering close to an edge of the entrance and/or passing close to a wall of the aperture, will not have the same duration as the identical particle entering on the axial center and passing through the center of the aperture. Additionally, the amplitude and/or profile of the signal may be considerably different from the signal produced by the on-center particle.

As explained in the co-pending application, the basic concept of the invention therein and that which is disclosed in this application is to measure the pulse duration of signals produced by the particles passing through the aperture and then to discriminate between these signals in some way, discarding the longer of them and using only the shorter ones. The circuitry of the sensors of the invention herein and that of the co-pending application embody the methods for doing this and utilize certain novel structure respectively for applying criteria for discarding some and using others. Although detailed in the co-pending application, it would also be of value here to explain the differences between the types of pulses which are produced by particles passing through the aperture of a Coulter electronic particle analyzing device.

Figure 6:
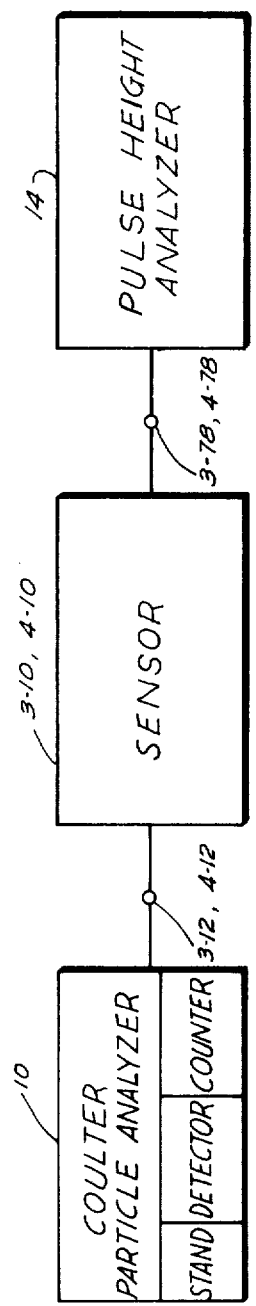
FIG. 6 is a block diagram of a system constructed in accordance with the invention and using an axial trajectory sensor.

A system constructed in accordance with the invention is illustrated in FIG. 6. The block 10 comprises a Coulter particle analyzing apparatus which is normally composed of a stand, detector and counter. The stand includes the vessels, aperture tube, fluid system and electrodes of the apparatus. The detector includes circuitry which produces the particle pulses. The counter may be any device which responds to the particle pulses, and may include pulse height discriminating means. It may be omitted in instances where only size studies are to be made, but is shown in order to point out that since the sensor 3-10 will be discarding many pulses, it is best to make any counts prior to applying the particle pulses to the sensor 3-10. As seen, from the sensor 3-10, the output signals at 3-78 are applied to some form of pulse height analyzer 14 in order to make the sizing studies.

Figure 1:
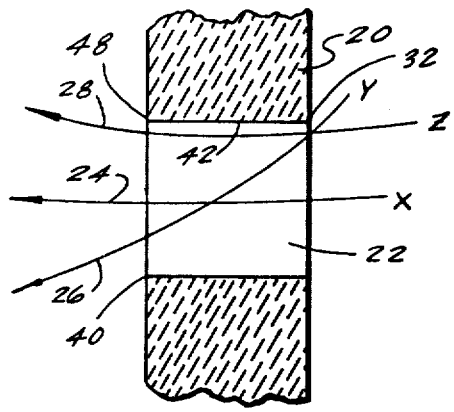
FIG. 1 is a diagrammatic view of the aperture of a Coulter particle analyzing apparatus showing the paths of different particles through the apparatus.

FIG. 1 is a diagrammatic view of an aperture which constitutes the scanning means in the stand of Coulter electronic particle device 10, immersed in a liquid and having particles passing through the aperture of the wafer. Thus, the wafer is designated 20, and the aperture itself is designated 22. The sample liquid is passing through the aperture 22 from right to left, and as it moves, it carries the particles in suspension with it. The paths of three particles, X, Y, and Z, are illustrated at 24, 26, and 28, respectively. These paths are deliberately chosen to be considerably different, for purposes of illustration, and the signal or particle pulses which are produced as a result of such passage are shown on the identical time base in FIG. 2 at graphs X, Y, and Z.

The particle X passes almost coaxially of the aperture 22 along the path 24. The speed of the liquid passing through the aperture at this point is maximum and the current density distribution along the path is most uniform. Accordingly, the resulting pulse 30 in FIG. 2, as shown in the curve X, is a simple bell-shaped pulse whose duration is proportional to the length of the aperture 22 from $t_1$ to $t_2$ and whose amplitude is quite closely proportional to the size of the particle. Although the amplitude will be considered as voltage, it should be understood that pulses and signals could also be current waves.

The particle Y passes through the aperture 22 on a diagonal path 26. In the first place, it will be appreciated that its path, while traversing the aperture, is longer than the path 24 because it is at an angle. In the second place, at the point where it entered the aperture, this being a corner at 32, the current density is much higher than that closer to the axis of the aperture. Accordingly, the beginning of the pulse 34 which is produced by this particle, will have a higher amplitude, and will also probably commence slightly before the pulse 30. If it commences at practically the same time $t_1$, due to its time within the aperture being longer, it will finish later than the time $t_2$. As shown, there is a peak at 36 due to the effect of high current density at the corner 32, and a lesser peak at 38 which is produced when the particle leaves the aperture, since it is approaching the high current density at the corner 40.

The particle Z goes through the aperture 22 on a relatively straight line, but in this case it is quite close to the wall 42 of the aperture. The resulting pulse 42' has two peaks, one at 44 caused by the corner 32 with its high current density, and the other at 46 caused by the particle passing the high current density corner 48. In this case, the particle will remain in the aperture longer than the time $t_1$ to $t_2$ because the speed of flowing liquid is less adjacent the wall than it is in the center of the stream. This is a well-known phenomenon of flow of liquids through orifices.

In these three cases, it can be seen that the only pulse which is most truly representative of the size of the particle is that which passes through the center of the aperture 22, namely, the particle X. According to the invention, circuitry is provided to discard pulses of the other types, based upon their time duration, since it becomes clear that only the pulses of shorter duration have gone through the center of the aperture and produced the most representative wave shapes.

Figure 2:
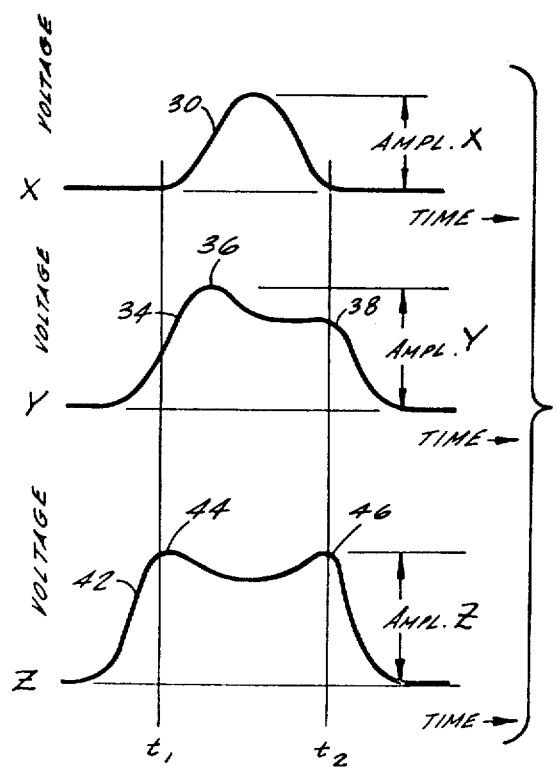
FIG. 2 is a diagram showing the graphs of particle pulses resulting from the passage of the particles of FIG. 1 along the paths shown through the aperture.

According to the invention, structure is provided to discriminate between the different types of pulses which are illustrated in the graphs of FIG. 2. The basis for discrimination in the apparatus which is described in connection with the several circuits detailed hereinafter is analog in nature, although as explained in the co-pending application, the basic concept which underlies both the invention herein and that of the said co-pending application can be applied to digitally operating apparatus as well.

Figure 3A:
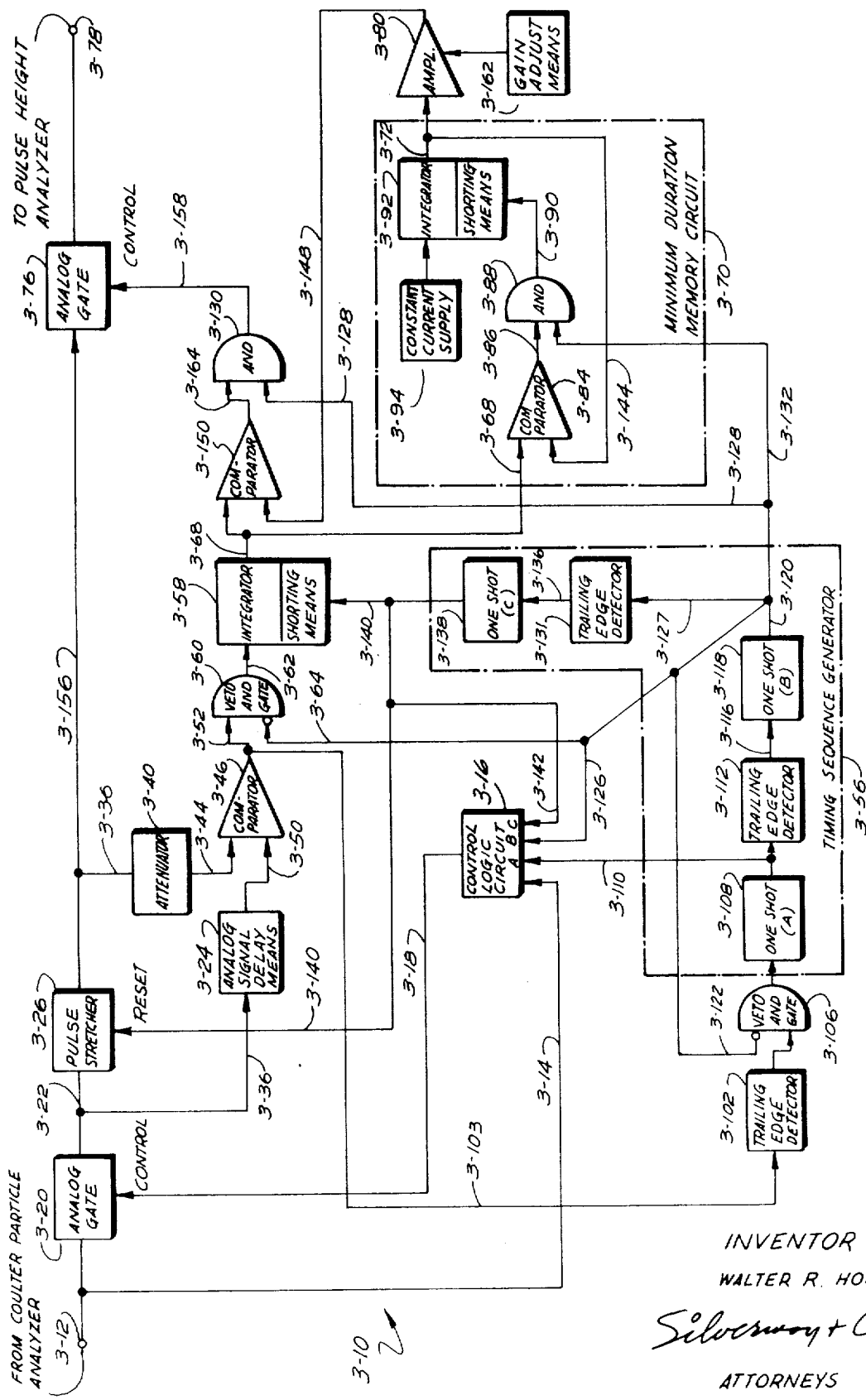
FIG. 3A is a block diagram of an axial trajectory sensor constructed in accordance with the invention.
Figure 3B:
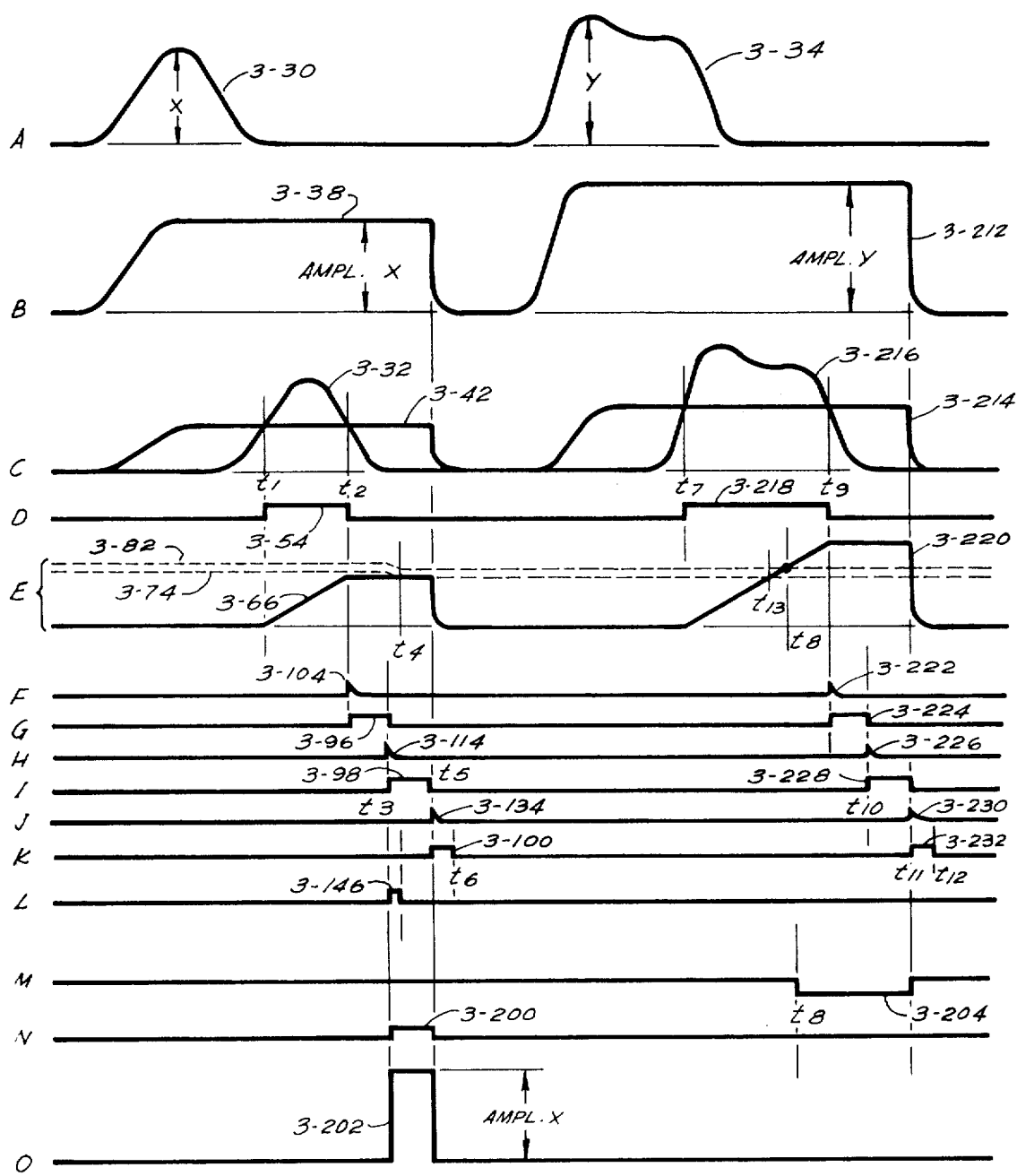
FIG. 3B is a diagram consisting of a series of graphs all on the same time scale illustrating various wave shapes throughout the sensor of FIG. 3A resulting from the processing of two particle pulses therein.

The block diagram of FIG. 3A illustrates an axial trajectory sensor which utilizes the basic concept and invention of the said co-pending application and in addition is constructed in accordance with this invention to achieve the purposes alluded to above. For the purposes of the explanation, it is assumed that two particles are being examined, such as particles X and Y of FIGS. 1 and 2 and the resulting wave shapes derived from the pulses throughout the circuit are illustrated in FIG. 3B, all on the same time base.

The apparatus of FIG. 3A is designated generally 3-10 and is characterized by the provision of means to discriminate between pulses of different durations, on the basis of which the desired pulses are chosen and permitted to pass through the apparatus, albeit in analog form. This discriminating means is automatically controlled by the pulses themselves, and operates on the assumption that practically all of the desirable pulses will have the same duration and that this duration will be the maximum duration tolerated. All pulses whose durations exceed this maximum will therefore be discarded, and all pulses which are less than this maximum duration will be accepted. A tolerance of duration is built in the circuitry so that pulses whose durations are slightly greater than the maximum will nonetheless be accepted.

Figure 4A:
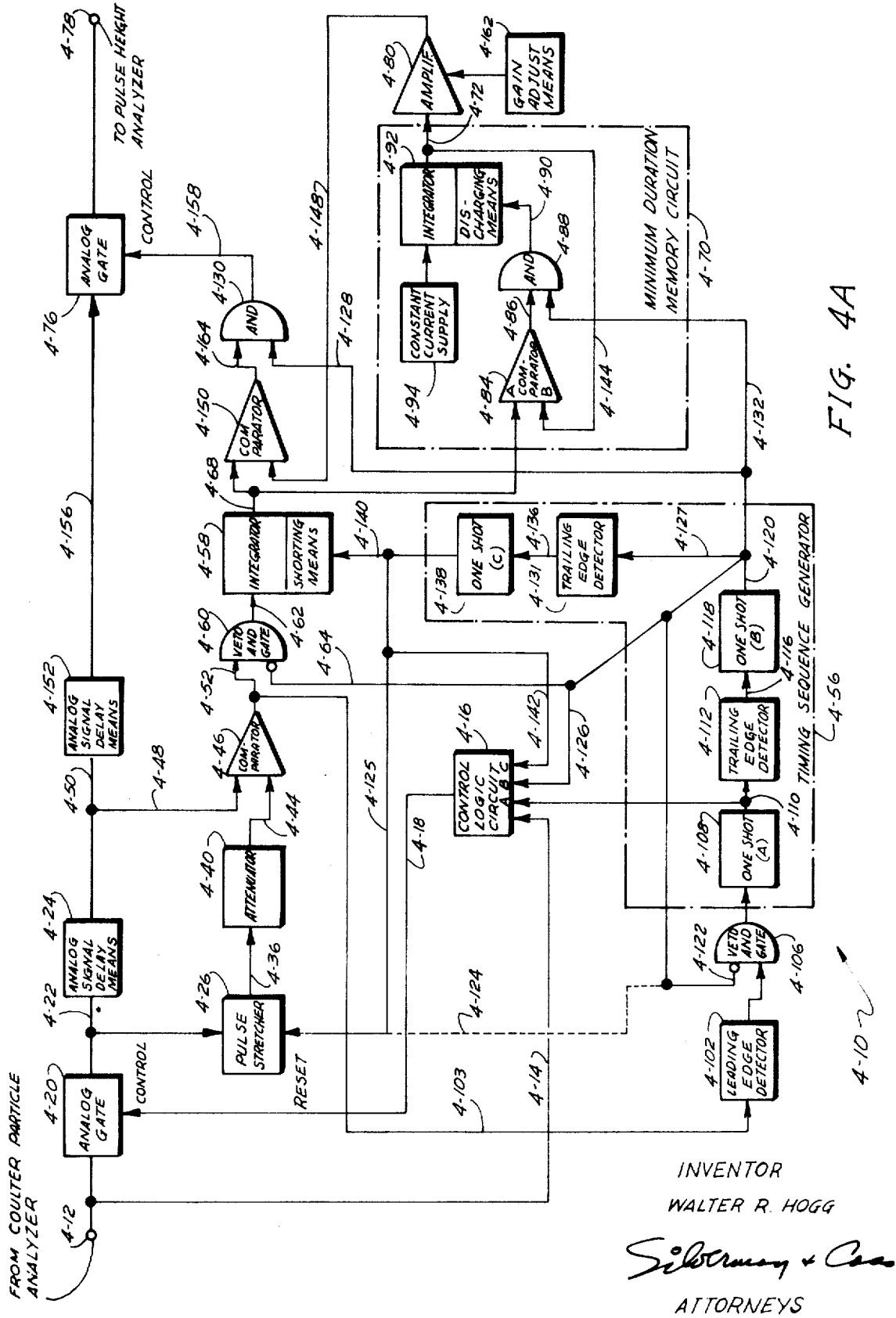
FIG. 4A is a block diagram of an axial trajectory sensor of a modified form.
Figure 5:
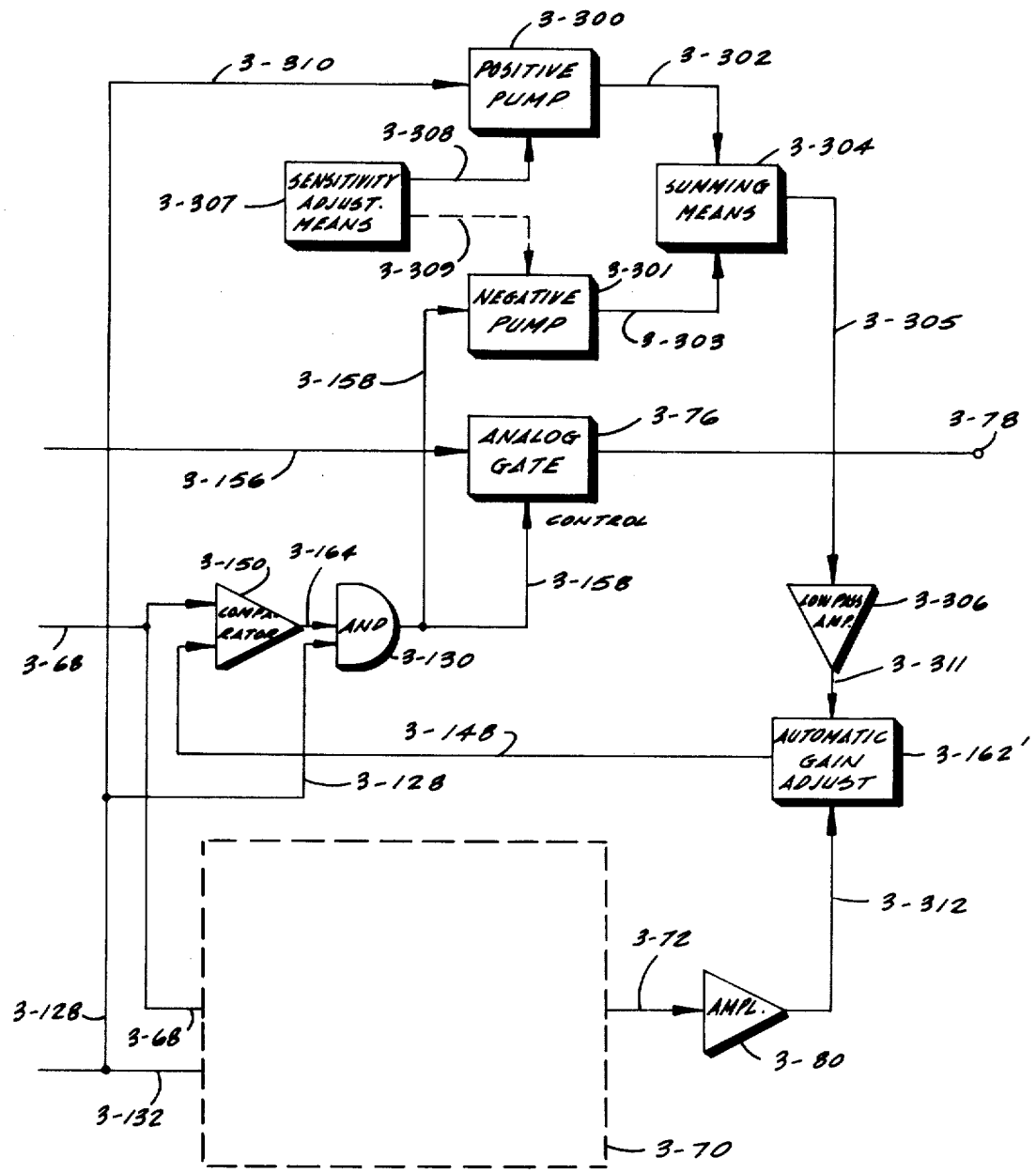
FIG. 5 is a fragmentary block diagram of an axial trajectory sensor of still another modified form.

This same discriminating means is used in the structures 4-10 and 5-10 of FIGS. 4A and 5 respectively, being common to all the structures which are described herein. In addition, there are means for disabling the apparatus during the processing of a pulse, the details of which will be explained. The purpose of the latter means is to prevent partial pulses of very small duration from causing an undesirable long-term reaction in the discriminating means, as for example, would occur if the apparatus is receptive too soon after a pulse has been processed, and a particle pulse immediately following is accepted after a part has already been held back. Simple threshold means can be used to prevent noise from affecting the discriminating means.

The output pulse of the sensor 3-10, in the event that one appears, in every case will have the identical amplitude as the original particle pulse, such as for example, the pulse 30 of FIG. 2, but will have a predetermined duration governed by the electronic characteristics of the circuitry. Since size information is paramount, the duration of the output pulse is immaterial, and according to the operation of the apparatus 3-10, all output pulses will have the same duration. This is also true of the apparatus 5-10 of FIG. 5.

In the case of the apparatus 4-10 of FIG. 4A, instead of an analog of the pulse input, the output pulses are actually reproductions of the input pulses, achieved by delay means as will be described.

Referring now to FIGS. 3A and 3B, the input terminal 3-12 has applied to it the train of pulses which emanate from the apparatus 10 that is constructed in accordance with the principles of U.S. Pat. No. 2,656,508. As such, these pulses have been produced as a result of particles passing through an aperture such as 22 illustrated in FIG. 1, and are of different amplitudes, durations and configurations. Ideally, the pulses emerging from a Coulter electronic particle device should all be bell-shaped (assuming that the conventional short aperture is used), should all have the same duration and should differ from one another only as to their amplitude. Practically, this does not always occur. The invention herein and that of the co-pending application are based upon the practical limitations of the usual Coulter device and seeks to render the information on size obtainable therefrom more accurate and reliable.

The train of pulses which is received at the terminal 3-12 has been amplified prior to application to the apparatus 3-10, this being accomplished by circuitry normally included in the detector of the usual Coulter electronic particle counting and sizing apparatus 10 or even afterwards.

The signals appearing at the input terminal 3-12 are the particle pulses such as illustrated in FIG. 2. The two pulses 3-30 and 3-34 shown in graph A of FIG. 3B represent the desirable and the undesirable pulses, respectively. It is desired to accept the first and reject the second, the output at 3-78 being an analog of the first pulse and there being no pulse at all corresponding to the second pulse. The first pulse 3-30 comprises a pulse produced by a particle which traversed the aperture 22 as approximately the center thereof, while the pulse 3-34 being caused by a particle which went through the aperture off center.

Considering first the pulse 3-30, it has an amplitude X and, assuming that it has passed through the analog gate 3-20, it appears on the line 3-22 and is applied simultaneously to the pulse stretcher 3-26 and the analog signal delay means 3-24. The capacitor of the pulse stretcher 3-26 follows the leading edge of the pulse 3-30, charging up to the amplitude X and holding this charge after the pulse 3-30 subsides. The result is the flat-topped pulse 3-38 of graph B of FIG. 3B, having an amplitude X and a duration controlled by other elements of the circuit. This pulse appears at the line 3-36 to be applied to the attenuator 3-40 and to the line 3-156 which extends to the output analog gate 3-76, this latter being closed at the time the pulse 3-38 commences. The attenuator 3-40 attenuates the pulse 3-38 to some desired fractional value of the amplitude X and the resulting fractional amplitude pulse 3-42 of the graph C appears at the input line 3-44 of the comparator 3-46. In the meantime, the pulse 3-30 has been delayed by the analog signal delay means 3-24 and appears as the pulse 3-32 on the line 3-50, being the second input to the comparator 3-46. The fractional amplitude for pulse 3-42 is chosen so that a sharp comparison can be made with pulse 3-32. Conveniently, this can be 50 percent, but other fractions can be used.

The two pulses 3-32 and 3-42 are shown superimposed on the graph C of FIG. 3B. Where the pulse 3-32 exceeds its own fractional height as measured by the attenuated pulse 3-42, namely between the times $t_1$ and $t_2$, the comparator 3-46 will have an output that appears as the rectangular pulse 3-54 at the line 3-52, shown in graph D of FIG. 3B. This is an input to the veto AND gate 3-60. It is also an input on the line 3-103 to the trailing edge detector 3-102. The output of this detector comprises the spike 3-104 of graph F which is delayed by the duration of the pulse 3-54 to the time $t_2$. It is applied to the lower input of the veto AND gate 3-106, and if the gate is open, passes to the first one-shot multivibrator (A) 3-108 of the timing sequence generator to produce a rectangular output pulse 3-96 (graph G) between the times $t_2$ and $t_3$. In this same manner, the timing pulses 3-98 and 3-100 are produced at the times shown in graphs I and K of FIG. 3B. Spikes 3-114 and 3-134 of graphs H and J are produced by the respective trailing edge detectors 3-112 and 3-131. The spike 3-114 appears at the line 3-116 and triggers the one-shot (B) 3-118, while the spike 3-134 appears at the line 3-136 and triggers the one-shot (C) 3-138. The timing pulse 3-98 appears at the lines 3-120, 3-132, 3-127, 3-122 (which extends back to the veto input of the veto AND gate 3-106), 3-64, 3-128 and 3-126.

The timing pulse 3-98 appears at the line 3-64 to the veto input of the veto AND gate 3-60 and this closes the gate, but note that this occurs at the time $t_3$ to $t_5$. Accordingly, since the duration measuring signal 3-54 occurs at time $t_1$ to $t_2$ it passes through the gate 3-60 and appears at the line 3-62, being applied to the integrator 3-58. The integrator 3-58 integrates the comparator output 3-54 and produces a ramp and pedestal pulse 3-66, the pedestal or plateau extending from the time $t_2$ when the comparator signal subsides to the time $t_5$. The timing sequence generator 3-56 is energized at the end of the comparator output pulse 3-54 and holds off all further incoming signals, until the measurement cycle is completed. This will be explained below.

It will be noted that the output of the one-shot (C) 3-138 which comprises the timing pulse 3-100 commencing at the time $t_5$ (see graph K) and extending for any desirable time to $t_6$, is applied by way of the lines 3-140 and 3-142 to the pulse stretcher 3-26, the shorting means of the integrator 3-58 and to the control logic circuit 3-16. The pulse stretcher and integrator are thus reset by the signal 3-100 between the time $t_5$ and $t_6$.

At the end of the delay one-shot pulse 3-96, as previously explained, that is, at the time $t_3$, the trigger spike 3-114 is produced from the trailing edge detector 3-112 at the line 3-116 and triggers the one-shot (B) 3-118. This is the strobing one-shot multivibrator of the sensor 3-10. It inhibits further trigger spikes from coming through the veto AND gates 3-106 and 3-60 and it also opens the AND gates 3-88 and 3-130. The effect of this will shortly be described. It can be readily seen that if this strobing pulse 3-98 can pass through the AND gate 3-130, it will become the pulse 3-200 (graph N) on the line 3-158, and will open the analog gate 3-76 between the time $t_3$ and $t_5$ and thereby permit a portion of the pulse 3-38 to pass to the terminal 3-78. The resulting output pulse 3-202 (graph O), has the amplitude X and the duration $t_3$ to $t_5$.

Whether or not the strobing pulse is effective depends upon the minimum duration memory circuit 3-70 which is the discriminating means to determine whether the strobing pulse will pass.

The signal pulse 3-66 appearing at the line 3-68 is applied to the comparator 3-150 and to the broken line block of FIG. 3A which is designated 3-70, this block comprising elements forming a minimum duration memory circuit. The output of this circuit 3-70 appears at 3-72 and such output comprises a d.c. voltage proportional to the minimum duration. This is the lower of the two broken line wave forms of graph E designated 3-74. The details of operation of the minimum duration memory circuit will be set forth below, but for the time being, it should be taken that it controls whether or not the pulse output from the integrator 3-58 (wave form 3-66) is effective to permit a portion of the stretched pulse 3-38 to pass through the last analog gate 3-76 to the output terminal 3-78. If the amplitude of the pulse 3-66 exceeds the voltage level of the line 3-72 by an amount controlled by the gain of the adjustable gain amplifier 3-80, the upper level being shown by the upper one of the broken line wave forms of graph E of FIG. 3B, namely 3-82, then the analog gate 3-76 will be closed, that is, the precision electronic switch which comprises this gate will be opened. Under these circumstances, no signals can get through to the output terminal 3-78. The situation is represented by the pulse 3-220 and the resulting effects.

The minimum duration memory circuit 3-70 is composed of an input comparator 3-84 operating into one terminal 3-86 of an AND gate 3-88 whose output 3-90 is applied to the shorting means of the integrator 3-92. The constant current supply 3-94 may consist of a constant voltage source and fixed resistor, the output of which is applied to the integrator 3-92 to cause the voltage at the output 3-72 to rise very slowly. In the graph E, the slope is exaggerated in the wave form 3-74. It is only necessary that the constant current supplied exceed any leakage at the input to the integrator 3-92 to ensure that the integrator always has a tendency to drift upward and never downward.

The pulse 3-98 from the one-shot 3-118 provides an input to the AND circuit 3-88 by way of the line 3-132 after the integrator pulse 3-66 has stopped increasing. If, at this time, the voltage at 3-68 is less than the voltage at 3-144, the comparator 3-84 has an output at 3-86 which combines with the signal at 3-132 to produce an output at 3-90 which is shown as the pulse 3-146 of graph L. When this happens, the discharging means of the integrator 3-92 is energized, causing the voltage at the output 3-72 to decrease between time $t_3$ and $t_4$ in graph E. When the voltage falls below the voltage at 3-68 at time $t_4$, the output from the comparator 3-84 disappears, removing the energizing signal 3-146 from the AND gate 3-88 and the shorting means of the integrator 3-92, thus causing the integrator output at 3-72 to hold at the new value which is that of the pulse at 3-68.

If the pulse at 3-68 is of greater amplitude than the voltage at 3-144, as is the case with the pulse 3-220, the comparator 3-84 will not have an output at 3-86, the shorting means of the integrator 3-92 is not activated, and the voltage at 3-72 is not affected. In this manner, since only pulses having durations shorter than the previous minimum cause the integrator output at 3-72 to decrease, the voltage at 3-72 is proportional to and represents the duration of the previous shortest pulse. This establishes a maximum duration.

The voltage derived and appearing at the path 3-72 is applied to the adjustable gain amplifier 3-80 which has a gain slightly greater than unity. This permits pulses slightly longer than the established maximum represented by level 3-74 to be accepted by the system and routed to the output terminal 3-78. This is accomplished by comparing the time-related pulses which appear on the path 3-68 with the d.c. voltage appearing on the path 3-148. If a pulse is slightly longer than the duration of the prior minimum duration pulse by a certain small percent, it will exceed the voltage at 3-148 if the gain of the amplifier 3-80 is adjusted to exceed unity by this small percentage. Only pulses of shorter duration will therefore result in an output on the line 3-164 to be applied to the AND gate 3-130. The maximum duration level is therefore established by the voltage 3-82. Any pulse of longer duration will not get through the sensor 3-10.

The adjustment of the amplifier 3-80 is accomplished in this case by some manual gain adjusting means 3-162. The voltage level on the line 3-148 corresponds to the broken line wave shape 3-82 of graph E of FIG. 3B.

The comparator 3-150 has, as one of its inputs, the voltage level at path 3-148 which is 3-82, and since the voltage plateau 3-66 appearing on the line 3-68 does not exceed that on the path 3-148, nothing happens on the output path 3-164. The output of the comparator 3-150 is shown in graph M of FIG. 3B and as seen it is a positive level, meaning that the comparator 3-150 normally has an output which is discontinued when the voltage on the upper input 3-68 exceeds that of the lower input 3-148. The addition of the strobe pulse 3-98 from the path 3-128 causes the strobe pulse 3-200 on the line 3-158 thereby connecting the output terminal 3-78 with the pulse stretcher line 3-156 for the duration of the strobe pulse. This results in the output pulse 3-202.

Now, when a pulse which is not desirable occurs, such as the pulse 3-34, much the same train of events occurs. The ramp of the pulse 3-220 does exceed the voltage level represented at 3-82 and hence the comparator 3-150 switches and removes its output from the path 3-164. This is shown as the negative pulse 3-204 of the graph M commencing at the time $t_8$. Having only one input signal, the AND gate 3-130 ignores the strobe pulse 3-98 arriving on the line 3-128 and hence the control line 3-158 has no pulse equivalent to the strobe pulse 3-200 and the amplitude Y of the long duration particle pulse 3-34 is ignored. Obviously, there is no output at the terminal 3-78.

Likewise, the voltage at the path 3-68 which is applied to the input of the comparator 3-84 exceeds that at the path 3-144, as shown in the graph E at the time $t_{13}$ and hence the AND gate 3-88 has no input at 3-86 when the strobe pulse 3-228 is applied at the time $t_{10}$.

The shorting means of the integrator 3-92 is not energized and the voltages on the paths 3-72 and 3-148 remain unchanged. The circuit 3-70 thus continues to remember the voltage corresponding to the shortest pulse. No pulse equivalent to pulse 3-146 occurs.

It will be seen that there is an analog gate 3-20 interposed between the terminal 3-12 and the pulse stretcher 3-26. Unless this gate is opened, no signals of any kind can be accepted by the sensor 3-10. Operation of this gate is controlled by the control logic circuit 3-16. This in turn functions to keep the sensor disabled so long as there are any signals on the lines 3-110, 3-126 and 3-142. Adjustment of the delays produced by the timing sequence generator 3-56 will enable the adjustment of the time that the sensor is turned off, with relation to the processing of a pulse. As explained, this prevents the arrival of any signals before the processing is complete. Circuit 3-16 also prevents part signals from triggering the apparatus. The details will be described hereinafter.

The sensor 4-10 which is described in connection with FIGS. 4A and 4B differs from the sensor 3-10 in several respects. The most important difference lies in the type of output which is produced by the respective apparatus. In the case of the sensor 3-10, the output at 3-78 is a rectangular pulse, having the amplitude of the particle pulse producing the same, and the duration of the strobe pulse produced by the one-shot 3-118. In the case of the sensor 4-10, the output is a delayed version of the original pulse, this being achieved through the use of double delay. The duration of the one-shot strobing pulse from the one-shot 4-118 is long enough to pass all of the delayed particle pulse. In addition, there is a slight difference in the timing means of the circuit.

The apparatus of FIG. 4A is designated generally by the reference character 4-10. The signal input at the terminal 4-12 comprises the pulses produced by a Coulter type particle apparatus and its associated amplifiers and power supplies. It comprises a series of pulses whose amplitudes are ideally proportional to the size of the respective particles causing the same. In all cases, the duration of the pulse is theoretically dependent upon the time spent by the particle in passing through the aperture 22. As seen, these durations vary because of the position of the particle in making the excursion, and the purpose of the sensor apparatus is to choose those pulses which are the shorter in duration since these represent the particles which have passed through the center of the aperture. From the terminal 4-12, there is a line 4-14 extending to the control logic circuit 4-16 mentioned above. The output of this circuit appears at the line 4-18 and is applied to the analog gate 4-20 which is interposed between the input terminal 4-12 and the line 4-22 leading to the analog signal delay means 4-24 and the pulse stretcher 4-26. The two types of pulses which are considered in the discussion of the apparatus 4-10 are those illustrated in graph A of FIG. 4B and are substantially the same as the pulses 3-30 and 3-34 of FIG. 3B. These are designated 4-30 and 4-34.

For the purpose of logical discussion, it will be assumed at this time that the analog gate 4-20 lets signals through so that the first pulse to be discussed, namely, the pulse 4-30 is applied to the analog signal delay means 4-24 and to the pulse stretcher 4-26. The duration of the pulse 4-30 is from the time $t_1$ to the time $t_2$ and it is delayed by the delay means 4-24 as seen in graph C of FIG. 4B, this delayed pulse being designated 4-32. The output of the pulse stretcher 4-26 appears at 4-36, and as seen it consists of a leading edge that is identical to the leading edge of the pulse 4-30 and a plateau which is equal in amplitude to the maximum amplitude reached by the pulse 4-30 extended to the time $t_7$. This stretched pulse is shown as 4-38 in graph B of FIG. 4B. From the pulse stretcher 4-26, the pulse 4-38 is applied to the attenuator 4-40 which decreases the amplitude of the stretched pulse, resulting in the attenuated pulse 4-42 shown in graph C superimposed on the pulse 4-32. This attenuated pulse 4-42 is applied to the input 4-44 of the comparator 4-46, the other input 4-48 being derived from the line 4-50 and carrying the output signal 4-32 of the analog signal delay means 4-24.

From the comparison of the two signals 4-32 and 4-42, an output appears at 4-52 which is a rectangular wave 4-54 having a predetermined amplitude controlled by the characteristics of the comparator 4-46 and a duration from $t_3$ to $t_4$ that is controlled by the points at which the pulse 4-32 exceeds the pulse 4-42. As previously explained, the attenuation of the stretched pulse 4-38 to produce the pulse 4-42 is a matter of choice to provide the best results. As shown here, it is chosen as 50 percent. The pulse 4-54 is shown in graph D of FIG. 4B.

The peak amplitude of the pulse 4-30 is stored for a period of time in the form of a charge on a capacitor, as in the case of the pulse stretcher 3-26 described herein and in said co-pending application. The amount of delay which is provided by the analog signal delay means 4-24 (conveniently an L-C delay line) is chosen to ensure that the pulse stretcher 4-26 has stored the amplitude of the pulse 4-30 before the comparison is made.

The line 4-52 has two branches, one of which leads to a timing sequence generator 4-56 and the other of which leads to the integrator 4-58 through the veto AND gate 4-60 and the line 4-62. As will be explained, there will be no output from the gate 4-60 unless there is an input at 4-52 and no input at 4-64. The pulse 4-54 passes to the integrator 4-58 (assuming that it is not blocked by the veto AND gate 4-60) and thereafter is converted into a ramp-and-pedestal shaped pulse 4-66 which appears at the line 4-68 from the time $t_3$ to the time $t_7$ as best shown in graph E of FIG. 4B. This is in accordance with the explanation previously given in connection with the apparatus 3-10, the ramp portion of the signal being discontinued at the time $t_4$ which is when the signal 4-54 is cut off. The condenser means in the integrator 4-58 retain their charge to establish the pedestal or plateau of the signal for the time which is chosen by other considerations of the circuit. The amplitude of the pedestal of the pulse 4-66 represents the half-height duration of the particle pulse 4-30. The greater the duration of the pulse 4-30, or any pulse which is processed by the apparatus, the higher will be the pedestal of the signal from the integrator 4-58.

The signal 4-66 is applied to the broken line block 4-70, this block comprising elements forming a minimum duration memory circuit identical to that of circuit 3-10. The output of this circuit 4-70 appears at 4-72 and such output comprises a DC voltage proportional to the minimum duration. This is the lower of the two broken line wave forms of graph E designated 4-74. The details of operation of this circuit have been previously explained. From such explanation, it is understood that it controls whether or not the pulse output of the integrator 4-58 (wave form 4-66) is effective to permit the particle pulse 4-30 to pass through the last analog gate 4-76 to the output terminal 4-78. If the amplitude of the pulse 4-66 exceeds the voltage level of the line 4-72 by an amount controlled by the gain of the adjustable gain amplifier 4-80, the upper level being shown by the upper one of the broken line wave forms of graph E of FIG. 4B, namely 4-82, then the analog gate 4-76 will be closed, that is, the precision electronic switch which comprises this gate will be opened. Under these circumstances, no signals can get through to the output terminal 4-78.

The minimum duration memory circuit 4-70 is composed of an input comparator 4-84 operating into one terminal 4-86 of an AND gate 4-88 whose output 4-90 is applied to the shorting means of the integrator 4-92. The constant current supply 4-94 may consist of a constant voltage and fixed resistor, the output of which is applied to the integrator 4-92 to cause the voltage at the output 4-72 of the integrator 4-92 to rise very slowly. In graph E the slope is exaggerated in the wave form 4-74.

Each time that the comparator 4-46 produces a pulse 4-54 at the line 4-52, the timing sequence generator 4-56 generates a train of timing pulses, these being the pulses 4-96 (graph G), 4-98 (graph H) and 4-100 (graph I). The leading edge detector 4-102 receives signal on line 4-103 and produces a spike 4-104 (graph F) at the time $t_3$ which is coincident with the leading edge of the pulse 4-54, and assuming that this spike passes through the veto AND gate 4-106 it will trigger the one-shot (A) multivibrator 4-108.

It will be recalled that the equivalent element 3-102 of the sensor 3-10 was a trailing edge detector in order to minimize the timing cycle, it only being necessary that the ramp pulse reach its final value before triggering the strobing one-shot. The leading edge of the pulse 4-96 is used in the case of the apparatus of FIG. 4A to cause the strobing pulse to occur more simultaneously with the doubly delayed particle pulse 4-154.

The output of one-shot 4-108 appears at 4-110 and becomes input A to the logic control circuit 4-16. It also is applied to the trailing edge detector 4-112 which produces a spike at the time $t_5$ which is similar to, but considerably delayed from the spike 4-104. This spike occurs at the line 4-116 and is the input to the second one-shot (B) multivibrator 4-118. The output of the multivibrator 4-118 is the rectangular wave 4-98 (graph H) between the times $t_5$ and $t_7$ and it appears at the line 4-120. This line has a plurality of branches which should be examined for the moment.

One connection from the line 4-120 extends to the veto input 4-122 of the veto AND gate 4-106; another branch 4-126 becomes the B input to the control logic circuit 4-16; the branch 4-64 extends to the veto input of the veto AND gate 4-60 as previously mentioned; one branch extends to the input 4-127 of the next trailing edge detector 4-131; one branch 4-132 extends to an input of the AND gate 4-130; and finally, the branch 4-132 extends to the second input of the AND gate 4-88 in the minimum duration memory circuit. Completing the complement of the timing sequence generator 4-56, the trailing edge detector 4-131 produces another spike similar to 4-104 at the time $t_7$ which appears at the input 4-136 of the one-shot (c) multivibrator 4-138. The output of this multivibrator is a short rectangular pulse 4-100 (graph I of FIG. 4B) that extends from the time $t_7$ to the time $t_8$ and is applied at 4-140 to the shorting means of the integrator 4-60 and via path 4-124 to the pulse stretcher 4-26 for reset purposes, and also becomes the C input at 4-142 to the control logic circuit 4-16.

The output pulse 4-98 from the one-shot multivibrator 4-118 is delayed by the duration $t_3$ to $t_5$ due to the action of the trailing edge detector 4-112 which provides a trigger pulse only at the end of the output pulse 4-96, that is, at the time $t_5$. The pulse 4-98 appears at 4-132, the input to the AND gate 4-88, after the output from the integrator 4-58 ceases to increase. This occurs while the pulse 4-66 in graph E is operating on the pedestal or plateau portion. If, at this time, the voltage at 4-68 is less than the voltage at 4-144, this latter being one of the inputs to the comparator 4-84, then the comparator 4-84 has an output at 4-86 which combines with the signal at 4-132 to produce an output at 4-90. This output is shown as a small pulse 4-146 between the times $t_5$ and $t_6$, the beginning of the pulse 4-98. This is shown in graph K of FIG. 4B. When this happens, the shorting means of the integrator 4-92 is energized for the period of time that the pulse 4-146 occurs, causing the voltage at the output of the integrator 4-92 to decrease. This is shown in the graph E of FIG. 4B at the time $t_4 - t_6$ where the broken line 4-74 drops slightly. When the voltage of the integrator 4-92 falls below the voltage 4-66, at the time $t_6$, the output from the comparator 4-84 disappears, removing the energizing signal from the AND gate 4-88 and the shorting means input 4-90 causing the integrator 4-92 to hold at the new value which is that of the pulse 4-66.

If the pulse 4-66 is larger than the voltage at 4-144, however, the comparator 4-84 does not have an output, the shorting means of the integrator 4-92 is not activated, and the voltage 4-74 is not effected. There would be no output signal 4-146. In this manner, since only pulses having durations shorter than the previous minimum causes the integrator output at 4-72 to decrease, the voltage 4-74 at 4-72 is proportional to and represents the duration of the shortest pulse previously processed.

The voltage 4-74 appearing at the line 4-72 is applied to the adjustable gain amplifier 4-80 which has a gain slightly greater than unity. This permits pulses which are slightly longer than the previous minimum to be accepted by the system and routed to the output terminal 4-78. This is accomplished by comparing the time-related pulses which appear at the path 4-68 with the DC voltage on the path 4-148. The voltage on the path 4-148 is the broken line wave form 4-82 of graph E of FIG. 4B and the voltage at 4-68 is, of course, the output pulse 4-66 of the integrator 4-58. If a pulse is slightly longer in time than the percentage adjustment set by the amplifier 4-80 it will remove the output from the comparator 4-150. This provides a slight increase over the level 4-74 to take care of slight variations in the time duration of pulses. Only pulses having a duration shorter than that represented by the voltage 4-82 will be accepted.

Figure 4B:
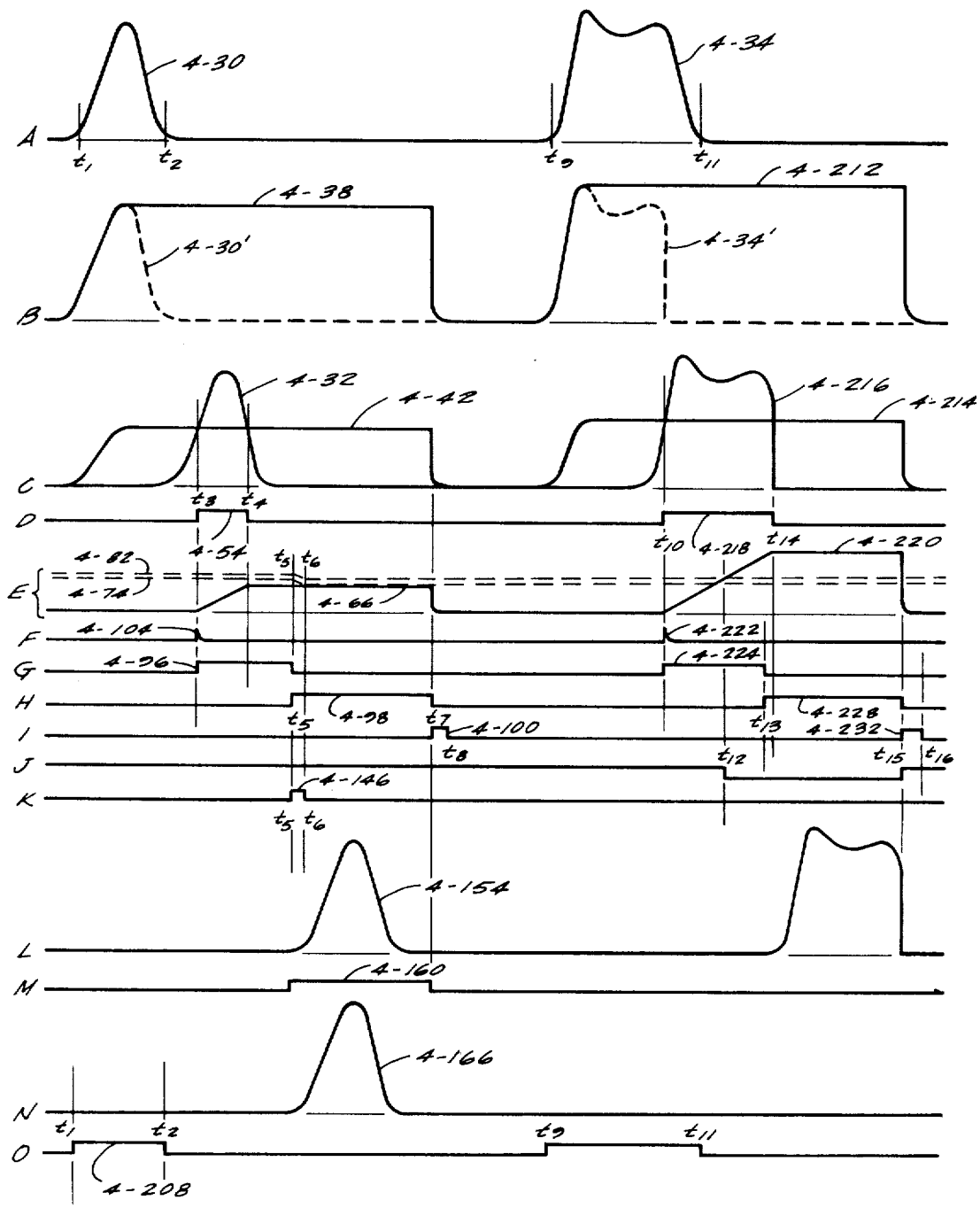
FIG. 4B is a diagram consisting of a series of graphs all on the same time scale illustrating various wave shapes throughout the sensor of FIG. 4A resulting from the processing of two particle pulses therein.

Assuming that the analog gate 4-20 is on, acceptably short particle pulses from the input terminal 4-12 will always pass through the analog signal delay means 4-24 and 4-152 and appear without wave form change as the pulse 4-154 at the line 4-156 (graph L, FIG. 4B). Whether or not the analog gate 4-76 permits these pulses to be impressed upon the output terminal 4-78 is determined by the state of the logic signal appearing at line 4-158, this being the output signal 4-160 (graph M, FIG. 4B) from the AND gate 4-130. This, in turn, is dependent upon whether or not the pulse duration does or does not exceed the value which is a predetermined percentage greater than the duration of the previous minimum duration pulse, the latter being established by the minimum duration memory circuit 4-70, and the percentage leeway being established by the amplifier 4-80 and its gain adjust means 4-162. It also depends upon the state of the logic or timing signal appearing on the line 4-128. If there is a signal at 4-164 out of the comparator 4-150, indicating that the duration of the pulse being analyzed is less than the maximum established by the amplifier signal 4-82, and the one-shot 4-118 has an output, the analog gate 4-76 will conduct and the particle pulse 4-166 (graph N, FIG. 4B) will appear at the output terminal 4-78.

The purpose of the one-shot multivibrators 4-108, 4-118 and 4-138 is to provide a timing sequence initiated at the instant that the delayed particle pulse on the line 4-50 exceeds the fractional height determined by the attenuator 4-40. This initial time in the graphs is at $t_3$. The one-shot multivibrator 4-108 is adjusted to contribute somewhat less than the total delay of the analog delay means 4-152 if it is desired to have the complete particle pulse appear at the output terminal 4-78. The pulse duration from the one-shot multivibrator 4-118 is accordingly somewhat longer in time than the longest legitimate particle pulse expected. The trailing edge of the pulse 4-96 is detected by the detector 4-112 which in turn triggers the one-shot multivibrator 4-118 to produce the rectangular wave pulse 4-98 from $t_5$ to $t_7$. The duration of this pulse 4-98 determines how long the analog gate 4-76 conducts and is therefore adjusted to allow passage of the pertinent portion of the signal through that gate, providing that there is a signal on the line 4-164 as explained above.

The output signal 4-98 from the one-shot multivibrator 4-118 also appears on the return path 4-122 to the veto input of the gate 4-106, and also on the veto input of the gate 4-60 by way of the line 4-64. It is also routed to the AND gate 4-130 as explained above. Since by the time that the one-shot multivibrator 4-118 is triggered at the time $t_5$, the pulse 4-54 from the comparator 4-46 has subsided, the pulse stretcher 4-26 may be reset by the output of the one-shot multivibrator 4-118 by way of the line dashed 4-124. Alternately, the pulse stretcher 4-26 may be reset by an output via path 4-125 from the one-shot multivibrator 4-138. This alternate method is illustrated by solid line 4-125 of FIG. 4A and the waveforms of FIG. 4B.

The output pulse from the one-shot multivibrator 4-118 is applied by the line 4-64 to the veto AND gate 4-60 to prevent false operation, which could happen if a second pulse follows closely after the one being analyzed, causing the comparator 4-46 to have a second output before the analysis of the first is completed. This also occurs in connection with the veto AND gate 4-106 which is disabled and prevents further signals from energizing the timing sequence generator for the period of time that there is an output from the one-shot multivibrator 4-118, that is, from the time $t_5$ to $t_7$.

The presence of the analog gate 4-20 and its control logic circuit 4-16 is to prevent the sensor circuit 4-10 from being turned on and made receptive to a new signal from the input terminal 4-12, unless the instantaneous voltage at the input terminal has dropped below a certain threshold. This ensures that the next pulse analyzed will be a complete one and not a partial pulse. If a pulse which follows one that has just been analyzed is quite close, then the sensor circuit 4-10 may be turned on while a partial pulse is at the input terminal. This pulse is seen as a truncated pulse possibly of very short duration. When this occurs the voltage at 4-72 will be dropped down unnecessarily and the apparatus will be inoperative until the constant current source 4-94 can charge the integrator 4-92 back up to a level representing the duration of the fastest acceptable pulses. This requires useless time.

Figure 4C:
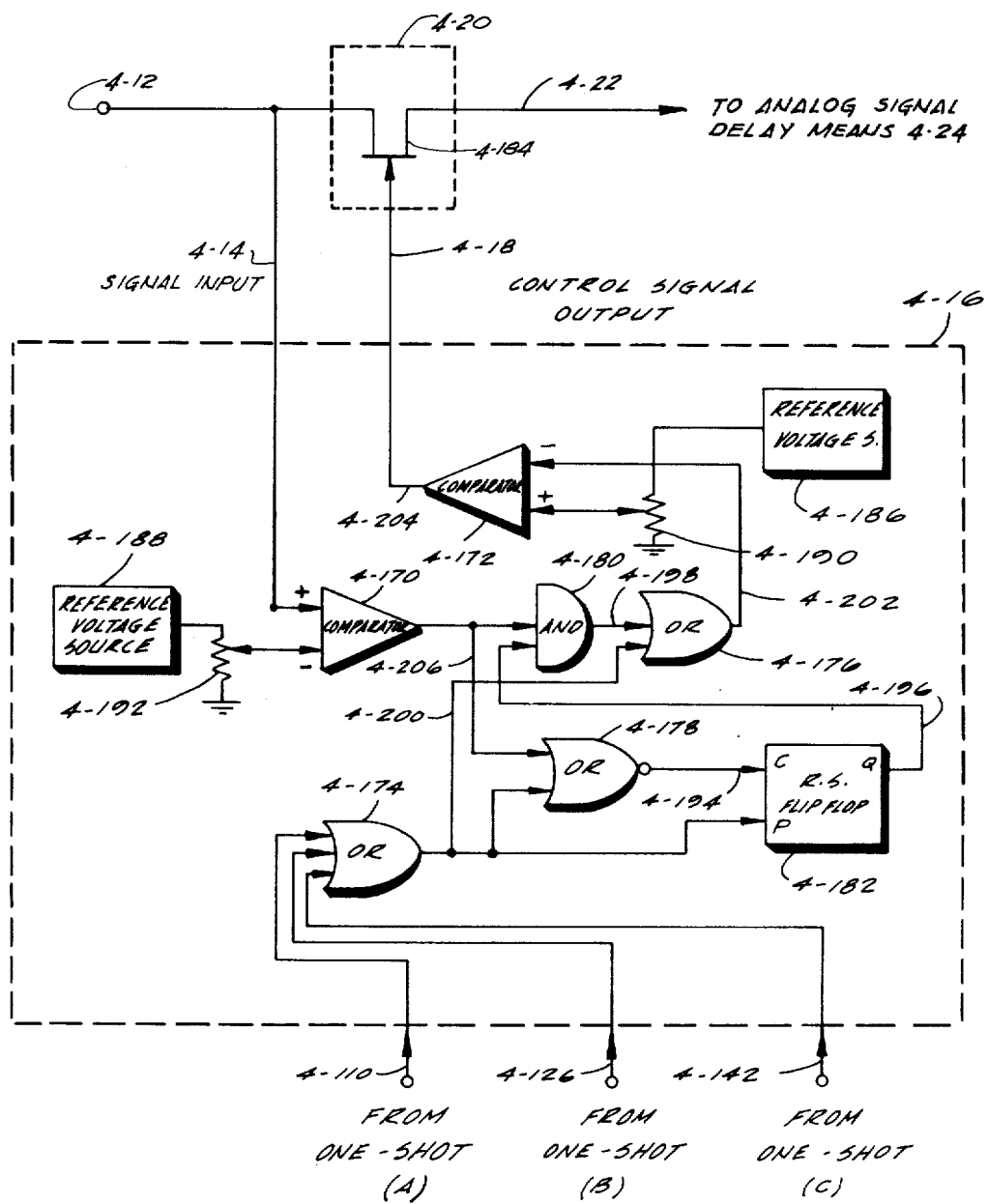
FIG. 4C is a detailed block diagram of the logic control circuit of FIGS. 3A and 4A.

The operation of the control logic circuit for preventing this is described in connection with FIG. 4C. The block designated 4-16 in FIG. 4A is comprised of a circuit including the comparators 4-170 and 4-172; the OR logic elements 4-174, 4-176 and NOR logic element 4-178; the AND gate 4-180; the reset-set flip-flop 4-182; and the electronic switch 4-184 which preferably is a field effect transistor. Each of the comparators has a reference voltage source connected through a resistor to its positive input terminal as shown at 4-186, 4-188, 4-190 and 4-192. The voltage level at the respective inputs is adjusted by varying the effective resistance of the resistors 4-190 and 4-192. The four input lines from externally of the block 4-16 are as identified in FIG. 4A and are so designated. The output line is also the equivalent of the same element in FIG. 4A. These lines are the equivalent of those similarly numbered but with prefix "3" in FIG. 3A.

The condition of no signals at the lines 4-110, 4-126 and 4-142 and at the input line 4-14 produces a logic 1 signal at the input line 4-194 leading to the C (CLEAR) input of the R.S. flip-flop 4-182. The output Q which is line 4-196 leading to the AND gate 4-180 is then in a logic 0 state, so that there is no output from the AND gate 4-180. This is a logic 0. The OR element 4-176 has its inputs 4-198 and 4-200 at logic 0, that is, without signals, and hence its output line 4-202 will be also without signal. Since this is the negative input to the comparator 4-172 there will be a positive output at the line 4-18. This is applied to the base of the f.e.t. 4-184 of analog gate 4-20 so that the transistor conducts. Thus, the analog gate 4-20 is also turned on, and the sensor apparatus 4-10 is in condition to pass incoming pulses to the pulse stretcher 4-26 and the analog signal delay means 4-24 for analysis.

During the period of time that a signal is being processed in the apparatus 4-10, there will be a signal (logic 1) present at one of the input lines to the OR element 4-174. This will be obvious from the description of FIGS. 4A and 4B and the period of time involved is $t_3$ to $t_8$. Thus, the output of the OR element 4-174 will comprise a signal (logic 1) which in turn produces a signal (logic 1) at the output 4-202 of the OR element 4-176 causing the comparator 4-172 to have a negative output at 4-204. This turns off the f.e.t. 4-184 and closes the analog gate 4-20 preventing the transfer of any further signals arriving at the input terminal 4-12 to the sensor circuit 4-10. A signal (logic 1) at the output of the OR element 4-174 also produces a signal (logic 1) at the Q output 4-196 of the flip-flop 4-182.

If, at the end of the processing time when the output of the OR element 4-174 reverts to a no signal condition (logic 0), the input terminal 4-14 is above the positive voltage set by the reference voltage source 4-188 and the resistor 4-192, and being connected to the negative input terminal of the comparator 4-170, the comparator will have a positive output at the line 4-206. This signal applied to the OR element 4-178 produces a logic 0 output from the OR element 4-178 at the line 4-194 as a result of which the Q output 4-196 of the flip-flop 4-182 will remain at a condition of signal output (logic 1). The presence of this signal and the positive output from the comparator 4-170 will produce a signal (logic 1) at the output line 4-198 of the AND gate 4-180. The output of the OR element 4-176 will remain at logic 1 and the f.e.t. 4-184 will remain off until the incoming signal at 4-14 falls below the threshold at which time the output of the AND gate 4-180 reverts to no signal (logic 0) and the f.e.t. 4-184 will again be turned on, and signals from the terminal 4-12 can be accepted by the apparatus 4-10.

Also, when the output of the comparator 4-170 reverts to logic 0, the OR element 4-178 will have a signal output (logic 1) and the Q output 4-196 of the flip-flop 4-182 will revert to a logic 0. Thus, all components are returned to their initial or cleared state, and a new signal will be accepted by the apparatus for processing.

From the above description of the control logic circuit 4-16, it will be seen that the output of the comparator 4-170 controls whether or not there will be a signal accepted. During the period of time that the signal 4-30 appears at the terminal 4-12, that is between the times $t_1$ and $t_2$ this comparator 4-170 will produce a signal 4-208 which will permit the acceptance of any signals to circuit 4-10. At all other times that there is an input at the lines 4-110, 4-126 or 4-142 no signals will be accepted. As soon as the lines clear, the sensor 4-10 will accept signals, providing the threshold of 4-188 is not exceeded by any signal at the input 4-14. The presence of this signal keeps the analog gate 4-20 closed.

Consider now the pulse 4-34 which, as seen, has a time duration of $t_9$ to $t_{11}$, substantially greater than the duration of the pulse 4-30. The processing of this pulse proceeds exactly as described in connection with the pulse 4-30, so that the same steps occur in the process. Graph B shows the stretched pulse 4-212 and, by broken lines, the pulses 4-30' and 4-34' which appear at output 4-22 of analog gate 4-20. Pulse 4-34' is truncated by the opening of gate 4-20 at time $t_{10}$. Graph C shows the attenuated pulse 4-214 and the delayed pulse 4-216 superimposed. The output of the comparator 4-46 is shown at 4-218 in graph D, and the integrated ramp and pedestal wave form 4-220 is shown in graph E. Since the duration of the original pulse 4-34 was greater than the pulse 4-30, the amplitude of the pedestal portion of the pulse 4-220 is greater than that of the pulse 4-66, and in this case is shown to exceed the upper limit established by the voltage 4-82 at the time $t_{12}$. The timing sequence generator 4-56 operates without change because it starts at the time $t_{10}$ which is the leading edge of the comparator output 4-218. Thus, the pulses 4-222, 4-224, 4-228, and 4-232 are generated as shown. It will be seen that there is no pulse equivalent to the pulse 4-146 which would have occurred at the time $t_{13}$ because the pulse 4-220 is larger than the voltage which appears at the line 4-144 so that the comparator 4-84 has no output. The gate 4-76 remains closed, and no pulse equivalent to the pulse 4-160 appears, so that the pulse 4-34 is rejected.

In FIG. 5 there is illustrated apparatus designed to improve the operation of the sensor 3-10 by replacing the manual gain adjustment means 3-162 by an automatic gain adjustment means. In FIG. 5, so much of the block diagram of FIG. 3A is reproduced as necessary to show the changes brought about by the substitution. The wave forms of FIG. 3B will not be materially changed except that the two broken line wave forms 3-74 and 3-82 of graph E may not be quite the same distance apart. In FIG. 3B, the distance between these two lines is constant, representing a pre-set gain which is applied to the amplifier 3-80 in order to establish the tolerance of duration above the maximum duration within which pulses will be accepted. The use of an automatic gain adjustment means will cause this distance to vary automatically in accordance with the conditions established by certain settings of the circuit.

If the manual adjustment 3-162 of sensor 3-10 is set at a given setting, some percentage of pulses will be rejected on the basis of pulse duration. The gain setting is thus an independent variable, and the percentage of pulses passed is a dependent variable. In the case of the automatic gain adjustment circuit of FIG. 5, there is a sensitivity adjust means 3-307 which is set at a given setting, that is, a percentage of pulses to be passed. The percentage passed will then be the independent variable, and the tolerance will become the dependent variable, adjusting itself to meet the conditions set by the sensitivity adjust means.

The adjustment of a control of the sensitivity of the circuit in terms of percentage to be accepted or rejected is a more readily grasped concept and hence easier to explain to operators. It is thus more likely to be set at an optimum condition.

The apparatus of FIG. 5 works on a feed-back principle, comparing some fraction of the total number of pulses processed per unit time with the number of pulses actually passed or rejected per unit time, and using the error signal so developed to cause the pulse duration tolerance to widen or narrow in order to minimize this error.

A pulse which occurs with each particle pulse is applied by way of the line 3-128 and the line 3-310 to the positive pump 3-300. This pulse comprises the strobing pulse, but the pulses could be obtained from other parts of the sensor 3-10. The primary consideration is that there is one pulse output for each particle pulse being processed by the device. The negative pump 3-301 is driven by the pulses derived from the output of the AND gate 3-130 on the line 3-158. These pulses are only the ones which are permitted to pass. The positive and negative pumps are rate meters. Their respective outputs are applied by means of the lines 3-302 and 3-303 to the summing means 3-304 from whence the resulting signal is applied through the low pass amplifier 3-306 by way of the lines 3-305 and 3-311 to the automatic gain adjust circuit 3-162'.

Through the sensitivity adjust means 3-307 and the control paths 3-308 and 3-309, the pumps are adjusted so that the summation of their outputs is equal to zero or substantially zero. (The phrases "positive" and "negative" pumps merely signifies that these circuits have an opposite sense.) They could easily be adjusted by adjusting the charging capacitors in the respective circuits.

Thus, if the percentage of pulses which one wishes to pass is 50 percent, then there would be twice as many pulses on the line 3-310 as there are on the line 3-158, and for a zero error voltage, the pumps would be adjusted so that each pulse applied to the negative pump 3-301 causes twice the charge on the line 3-303 as each pulse applied to the positive pump 3-300. The summing means, which may be a simple input terminal to an integrator, the integrator being the low pass amplifier 3-306, will then see a zero error signal and the automatic gain adjust means 3-162' will not change the tolerance between the levels 3-74 and 3-82. The sensitivity adjust means 3-307 could be a type of switching device that makes the pump capacitor in the pump 3-301 twice the size of the pump capacitor in the pump 3-300.

If it is assumed for purposes of example, that the output of the low pass amplifier 3-306 is such that the gain of the automatic gain adjust means 3-162' is too high, then the level of the broken line 3-82 of graph E of FIG. 3B is much higher than the level of the broken line 3-74. Assume further that not only is this too high, but is twice as high as the level 3-74. Thus, pulses which have durations twice the lower level will be accepted and produce output pulses at 3-78. In other words, the tolerance is now 100 percent. Practically, about 90 percent of the pulses may be accepted, so that there are ninety percent as many pulses at 3-158 as there are at 3-310. Additionally, the negative pump 3-301 is producing twice as much charge per pulse as the pump 3-300. Accordingly, the output at 3-303 will be much greater than that at 3-302 and they will not balance at the summing means 3-304. Instead, the low pass amplifier 3-306 will have a large output, and it will be coupled in such phase with the automatic gain adjust means 3-162' that this will produce a voltage at 3-311 which will reduce the gain of the automatic gain adjust means 3-162'. The upper voltage level 3-82 will therefore descend closer to the level 3-74 and this will continue until there is only a slight unbalance left at 3-305. The system will tend to stabilize at a condition where approximately 50 percent of the pulses get through. This value is approximate because of the practical considerations of the low pass amplifier 3-306. The criterion is its time constant which should be chosen to make the fluctuation as small as desired without inordinately increasing the time within which equilibrium is reached.

The low pass amplifier 3-306 could be an integrator, as stated, which will thus have a substantial gain at d.c.

The automatic gain adjust means 3-162' could be an electronic analog divider of a type such as described in "The Microelectronics Data Book," 2nd Edition, published by the Motorola Co. using their analog multiplier Motorola MC 1595L. The path 3-312 would be connected to its "numerator" input, and the path 3-311 would be connected to its "denominator" input. Hence, the larger the signal from the low pass amplifier 3-306, the smaller would be the gain through it. The error signal would always be great enough to keep the gain at least as high as unity. Obviously, if the gain ever dropped below unity, all of the ramp and plateau pulses like 3-66 and 3-220 would exceed the voltage on the path 3-148 and no pulses would get through. In this case, only the positive pump 3-300 would have an output and the gain of the automatic gain adjust means 3-162' would rise rapidly until it reached equilibrium from the other direction.

It will be obvious that variations can be made in all of the structures described herein without departing from the spirit or scope of the invention as claimed hereinafter. As an example, the tolerance which is represented in FIGS. 3B and 4B by the difference between the voltage levels 3-74 and 3-82 and the levels 4-74 and 4-82 need not be established by increasing the lower level through the use of the adjustable amplifiers 3-80 or 4-80. Instead, the latter could be omitted, and the electrical time signal pulses from the integrators 3-58 and 4-58 respectively could be slightly attenuated by an attenuator interposed in the line between the integrator and the comparator 3-150 or 4-150. Means for adjustment could easily be furnished.

What it is desired to secure by Letters Patent of the United States is:

I claim:

1. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:

A. input terminal means and output terminal means having a channel for passage of electrical signals between the terminal means with switch means in said channel to control the signals which appear at the output terminal means, the input terminal means adapted to have said desirable and other particle pulses applied thereto, B. means for measuring the duration of a particle pulse applied to said input terminal means at some predetermined fraction of the amplitude thereof and deriving a duration-measuring pulse of constant amplitude and having the measured duration, C. means for converting said duration-measuring pulse into an electrical time signal pulse whose amplitude is proportional to the duration of said duration-measuring pulse, D. means for producing a voltage level representative of the amplitude of a prior electrical time signal pulse produced by a desirable particle pulse, E. means for comparing the amplitude of said electrical time signal pulse with said voltage level and providing a first type of energizing signal if the amplitude exceeds the said voltage level and a second type of energizing signal if the amplitude of said electrical time signal does not exceed said voltage level, F. means for modifying one of said voltage level and said last-mentioned electrical time signal pulse prior to comparing the same to establish a predetermined tolerance enabling the production of the second type of energizing signals even if the amplitude of said electrical time pulse exceeds said voltage level to some extent, and G. means for applying one of said types of energizing signals to said switch means in said channel to permit passage to said output terminal means of only electrical signals derived from desirable particle pulses.

2. The sensor as claimed in claim 1 in which said measuring means generates said last-mentioned derived electrical signals, which comprise output pulses of predetermined duration but having the respective amplitudes of desirable particle pulses.

3. The sensor as claimed in claim 1 which includes means causing said last-mentioned derived electrical signals to comprise desirable pulses passing through said channel.

4. The sensor as claimed in claim 1 in which there is a timing sequence generator for producing a strobing pulse in timed relation to said electrical time signal pulse, means connecting said generator with said applying means whereby said strobing pulse will operate said switch means in the channel to pass electrical signals when said second type of energizing signal is applied to said switch means but will not operate said switch means when said first type of energizing signal is applied thereto.

5. The sensor as claimed in claim 1 in which the modifying means comprise means for adjusting the first-mentioned voltage level to a second voltage level higher than said first-mentioned voltage level by an amount to establish said predetermined tolerance, and in which said amplitude of said electrical time signal pulse is compared with the said second voltage level.

6. The sensor as claimed in claim 5 in which said means for adjusting said first-mentioned voltage level for tolerance includes an amplifier and manual adjust means therefor.

7. The sensor as claimed in claim 5 in which said means for adjusting said first-mentioned voltage level for tolerance includes an amplifier and automatic adjust means therefor responsive to the relation between all particle pulses received by said sensor and the percentage particle pulses producing derived electrical signals passing to said output terminal means.

8. The sensor as claimed in claim 7 in which means are provided to pre-set the percentage.

9. The sensor as claimed in claim 5 in which means are provided for dropping said first-mentioned and second voltage levels to the amplitude of said electrical time signal pulse after comparing same, but said dropping means being operative only if the amplitude of said electrical time signal pulse does not exceed the second voltage level, and said first voltage level producing means including a memory for substantially retaining the first voltage level after dropping; until another electrical time signal pulse arrives.

10. The sensor as claimed in claim 9 in which said first-mentioned voltage level establishing means is an integrator and said dropping means include a comparator and a timing gate connected with the reset means of said integrator.

11. The sensor as claimed in claim 5 in which said first-mentioned voltage level producing means comprise an integrator.

12. The sensor as claimed in claim 1 in which there is an analog gate in said channel between said input terminal means and the remainder of said sensor and having a control circuit for opening and closing the same, said control circuit having means for producing control signals to close said gate in response to the existence of certain signal conditions in parts of said sensor.

13. The sensor as claimed in claim 12 in which said last-mentioned means respond to the presence of a particle pulse being operated upon by said sensor to disable the channel to receive other particle pulses at said input until the operation is complete.

14. The sensor as claimed in claim 13 in which said sensor has timing signal producing means driven by said particle pulse while being operated upon for producing said control signals.

15. The sensor as claimed in claim 13 in which said last-mentioned means comprise a timing sequence generator energized by said duration measuring means for producing said timing signals until after application of said energizing signals to the switch means in said channel whereby to disable said sensor from receiving particle pulses at its input means until after application of said energizing signals.

16. The sensor as claimed in claim 12 in which said last-mentioned means respond to the presence of a voltage at said input means which exceeds a predetermined threshold to close said gate until said voltage at said input means subsides below said threshold, whereby only complete particle pulses can pass through said analog gate.

17. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:

A. input terminal means and output terminal means having a channel for passage of electrical signals between the terminal means with switch means in said channel to control the signals which appear at the output terminal means, the input terminal means adapted to have said desirable and other particle pulses applied thereto, B. means for measuring the duration of a particle pulse applied to said input terminal means at some predetermined fraction of the amplitude thereof and deriving a duration-measuring pulse of constant amplitude and having the measured duration,
C. means for converting said duration-measuring pulse into an electrical time signal pulse whose amplitude is proportional to the duration of said duration-measuring pulse,
D. means for establishing a voltage level representative of the amplitude equivalent to the maximum duration of desirable particle pulses,
E. means comparing the amplitude of said electrical time signal with said voltage level and providing a first type of energizing signal if said amplitude exceeds said level and a second type of energizing signal if the amplitude does not exceed said level,
F. gating means provided between the comparing means and the switch means,
G. strobing pulse producing means connected with said switch means and coupled with said duration measuring means to produce a strobing pulse at said gating means in timed relation to a particle pulse applied to said input terminal means,
H. means for applying all particle pulses through said channel to said switch means in synchronized relation with said strobing pulse,
I. means for applying said energizing signals to said gating means, said gating means being constructed to pass said strobing pulse to operate said switch means to signal-passing condition only when said second type of energizing signal is applied to said gating means, whereby said switch means will be activated to pass particle pulses whose duration is less than said maximum duration.

18. The sensor as claimed in claim 17 in which there is a connection between said channel and said measuring means and analog signal delay means between said input terminal means and said connection whereby to delay application of said particle pulses to said measuring means.

19. The sensor as claimed in claim 17 in which said means for applying said particle pulses through said channel comprise analog signal delay means in said channel.

20. The sensor as claimed in claim 19 in which there is a connection between said channel and said measuring means and at least a portion of said analog signal delay means between said input terminal means and said connection whereby to delay application of said particle pulses to said measuring means.

21. The sensor as claimed in claim 17 in which said measuring means comprise circuitry to produce a stretched pulse of a duration substantially greater than the duration of the particle pulse from which the same is derived and having an amplitude over a substantial portion of its duration which is said predetermined fraction of the amplitude of the particle pulse from which same is derived, and second means for comparing said last-mentioned particle pulse with said stretched pulse during a period of time when the amplitude of said stretched pulse is constant.

22. The sensor as claimed in claim 21 in which analog signal delay means are provided to delay application of said last-mentioned particle pulse to said second comparing means.

23. The sensor as claimed in claim 21 in which said means for applying said particle pulses through said channel comprise second analog signal delay means in said channel, said first analog signal delay means also being in said channel and acting upon all pulses passing through the channel.

24. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration; said sensor acting to respond to said desirable particle pulses and not to respond to said other pulses and comprising:
A. input terminal means and output terminal means having a channel for passage of electrical signals between the terminals with switch means in said channel to control the signals which appear at the output terminal means, the input terminal means adapted to have said desirable and other particle pulses applied thereto,
B. means for measuring the duration of at least a predetermined portion of a particle pulse applied to said input terminal means at some predetermined fraction of the amplitude thereof and deriving a duration-measuring pulse of constant amplitude and having the measured duration,
C. means for converting said duration-measuring pulse into an electrical quantity whose value is proportional to the time duration of said duration-measuring pulse,
D. means establishing an electrical effect of a standard equivalent to a maximum desired duration distinguishing between quantities produced by desirable and other pulses,
E. means comparing said quantity with said standard and providing one type of energizing signal if the quantity exceeds the standard and a second type of energizing signal if the said quantity does not exceed the standard,
F. means for applying one of said energizing signals to the switch means in said channel to permit passage to said output terminal means of only electrical signals derived from desirable particle pulses, and
G. an analog gate in said channel between said input terminal means and the remainder of the sensor and having a control circuit for opening and closing the same, said control circuit having means for producing control signals to close said gate in response to the existence of certain signal conditions in parts of said sensor.

25. The sensor as claimed in claim 24 in which said last-mentioned means respond to the presence of a particle pulse being operated upon by said sensor to disable the channel to receive other particle pulses at said input until the operation is completed.

26. The sensor as claimed in claim 25 in which said sensor has timing signal producing means driven by said particle pulse while being operated upon for producing said control signals.

27. The sensor as claimed in claim 25 in which said last-mentioned means comprise a timing sequence generator energized by said duration measuring means for producing said timing signals until after application of said energizing signals to the switch means in said channel whereby to disable said sensor from receiving particle pulses at its input means until after said application of said energizing signals.

28. The sensor as claimed in claim 25 in which said last-mentioned means also respond to the presence of a voltage at said input means which exceeds a predetermined threshold to close said gate until said voltage at said input means subsides below said threshold, whereby only complete particle pulses can pass through said analog gate.

29. The sensor as claimed in claim 24 in which said last-mentioned means respond to the presence of a voltage at said input means which exceeds a predetermined threshold to close said gate until said voltage at said input means subsides below said threshold, whereby only complete particle pulses can pass through said analog gate.

30. The method of sensing between the particle pulses caused by particles passing through a Coulter particle apparatus aperture on axis of the aperture and off the axis of the aperture, which comprises:
  A. measuring the duration of at least a predetermined portion of each particle pulse at a predetermined fraction of the amplitude thereof and deriving therefrom a duration-measuring pulse of constant amplitude and having a predetermined duration,
  B. converting the duration-measuring pulse into an electrical time signal pulse whose amplitude is proportional to the time duration of said duration-measuring pulse,
  C. establishing a signal level equivalent to a maximum desired duration distinguishing between electrical time signal pulses produced by particle pulses which pass through the aperture off the axis and other particle pulses of shorter duration,
  D. comparing the said electrical time signal pulse with said signal level and obtaining an energizing signal of one type if the signal level is exceeded and a second type of energizing signal if the signal level is not exceeded,
  E. deriving an electrical signal from each pulse, and blocking or passing said derived signal on the basis of whether it has produced an energizing signal of the first type or the second type, respectively, and
  F. rendering said measuring step ineffectual for a substantial time after execution thereof whereby to block sensing of pulses arriving while one is being processed.

31. The method of sensing between the particle pulses caused by particles passing through a Coulter particle apparatus aperture on axis of the aperture and off the axis of the aperture, which comprises:
  A. measuring the duration of at least a predetermined portion of each particle pulse at a predetermined fraction of the amplitude thereof and deriving therefrom a duration-measuring pulse of constant amplitude and having a measured duration,
  B. converting the duration-measuring pulse into an electrical time signal pulse whose amplitude is proportional to the time duration of said duration-measuring pulse,
  C. establishing a signal level equivalent to a maximum desired duration distinguishing between electrical time signal pulses produced by particle pulses which pass through the aperture off the axis and other particle pulses of shorter duration,
  D. sensing the duration of the shortest duration electrical time signal pulse occurring prior to the particle pulse being sensed and adjusting the signal level in response thereto, said shortest duration electrical time signal pulse being one which has not exceeded the signal level prevalent at the time of its occurrence,
  E. comparing the said electrical time signal pulse with said signal level and obtaining an energizing signal of one type if the signal level is exceeded and a second type of energizing signal if the signal level is not exceeded, and
  F. deriving an electrical signal from each pulse, and blocking or passing said derived signal on the basis of whether it has produced an energizing signal of the first type or the second type, respectively.

32. An axial trajectory sensor for use with a particle study apparatus in which particles pass through a detecting zone having an axis for producing particle pulses, the particles, when passing closest to an axial trajectory through the detecting zone, producing desirable particle pulses having amplitudes which are most nearly proportional to the respective sizes of the particles, and also thereby having a certain approximate duration, and in which particles passing through the detecting zone on trajectories displaced from its axis will produce other particle pulses having amplitudes which are not necessarily proportional to their respective sizes and having durations which tend to be longer than said certain approximate duration; said sensor being constructed with an input and arranged to respond to said desirable particle pulses in a first manner and to respond to said other particle pulses in a second manner and comprising:
  A. means for measuring the duration of at least a predetermined portion of a particle pulse applied to the input of said sensor at some predetermined fraction of the amplitude thereof and deriving a duration-measuring pulse having the measured duration;
  B. means for establishing an electrical standard value representative of the duration of a prior desirable particle pulse;
  C. means for comparing each said duration-measuring pulse with said standard value and for providing a first type of energizing signal if said standard value is not exceeded and a second type of signal if said standard value is exceeded;
  D. means for modifying one of said standard value and said duration-measuring pulse prior to their comparison to establish a predetermined tolerance enabling the production of the first type of energizing signal even if the duration-measuring pulse exceeds said standard value to some extent, and
  E. means coupled to receive said first and second types of signals for generating, respectively, the first and second manners of response.

* * * * *